(12) United States Patent
Devenere

(10) Patent No.: US 12,243,073 B1
(45) Date of Patent: Mar. 4, 2025

(54) ON-DEVICE AUCTION BUDGET DELIVERY CONTROLLER

(71) Applicant: Amazon Technologies, Inc., Seattle, WA (US)

(72) Inventor: John Tyler Devenere, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/208,867

(22) Filed: Jun. 12, 2023

(51) Int. Cl.
*G06Q 30/02* (2023.01)
*G06Q 30/0241* (2023.01)
*G06Q 30/0251* (2023.01)
*G06Q 30/0273* (2023.01)

(52) U.S. Cl.
CPC ..... *G06Q 30/0249* (2013.01); *G06Q 30/0255* (2013.01); *G06Q 30/0275* (2013.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 8,700,462 | B2* | 4/2014 | Collins | G06Q 30/02 707/999.007 |
| 10,467,655 | B1* | 11/2019 | Feldman | G06Q 30/0201 |
| 2013/0097013 | A1* | 4/2013 | Schaub | G06Q 30/0241 705/14.45 |
| 2016/0180373 | A1* | 6/2016 | Xu | G06Q 30/0272 705/14.43 |
| 2017/0358000 | A1* | 12/2017 | Jain | G06Q 30/0249 |
| 2018/0108049 | A1* | 4/2018 | Kitts | G06Q 30/0272 |
| 2019/0102807 | A1* | 4/2019 | Pham | G06Q 30/0275 |
| 2021/0174389 | A1* | 6/2021 | Barajas Zamora | G06Q 30/0246 |

* cited by examiner

*Primary Examiner* — Vincent M Cao
(74) *Attorney, Agent, or Firm* — Lee & Hayes, P.C.

(57) ABSTRACT

A system can be configured to provide an advertiser budget control system designed to work within the confines of a privacy preserving content delivery environment intended to reduce or eliminate third-party cookies. This system uses a control system, a PID controller and duty cycle, to control budget delivery to place content within a browser. The control system can be used to stably deliver budget with real-time delivery rate updates while also preventing overspending of budget.

20 Claims, 9 Drawing Sheets

ON-DEVICE AUCTION BUDGET DELIVERY CONTROLLER

BACKGROUND

Online and mobile advertising are becoming increasingly prevalent and highly targeted. Advertising may take the form of promotional marketing messages, electronic coupons or offers, political statements, social communications, and various other types of messages sent to user devices (e.g., mobile devices, wearables, desktop computers, etc.). The growth and popularity of electronic advertising has incentivized an increase in the collection of users' private data by social media and advertising platforms (e.g., Facebook™, Google™, Microsoft™, Twitter™, etc.). These entities develop techniques to select and/or bid for electronic advertisements based on various types of user data in order to send targeted advertisements to users' devices on behalf of advertisers. For these entities, the more user data they are able to gather, and the more meaningful that data is from an advertising perspective, the better they are able to perform targeted electronic advertising. Advertising can be supplied through auction-based advertising exchanges. Each ad impression can be traded with a different price through an auction, making enhancements and modeling extraordinarily difficult.

While advertising platforms and advertisers have an incentive to collect and leverage personal data of users, they are limited by concerns of user privacy. For example, in Europe the General Data Protection Regulation restricts the collection and use of personally private data, and similar rules govern advertising activity in the United States. Advertisement platforms that do not collect meaningful personal or sensitive data, on the other hand, may be unable to adequately perform targeting or price bidding for particular advertisement campaigns. Consequently, existing techniques for targeted advertising result in compromised privacy for individuals, weaker targeting for advertisements, or both. Further, when advertisers' own targeted campaign rules are shared with advertising platforms, there is a risk that the advertisers' or the platforms' own business data (e.g., campaign parameters) will be shared with competitors or other unauthorized entities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
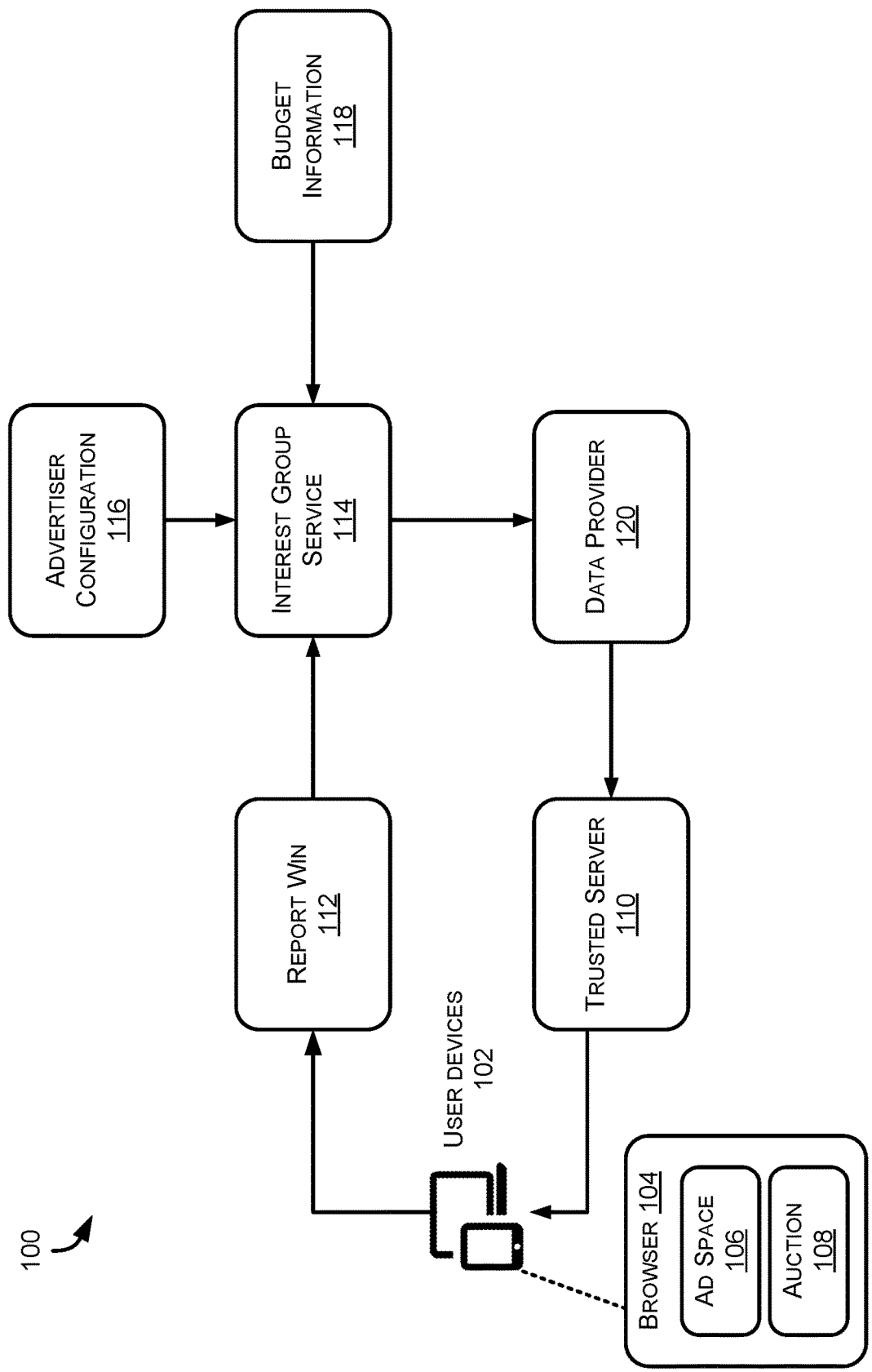
FIG. 1 illustrates a system for providing on-device advertising auctions to remain at or within advertising budget constraints in real-time within a privacy-preserving advertising environment.

Described herein are techniques for an advertiser budget control system designed to work within the confines of an advertising environment that includes limitations intended to ensure a privacy protecting environment and prevent third-party tracking of users through a browser. For example, Protected Audience API by Google presents a proposal for serving targeted ads without the use of third-party cookies. The advertising environment of the Protected Audience API involves shifting the advertisement auction from the server side, onto the user's device so that information about the user isn't shared with advertisement providers or advertising service providers. Other similar technologies, systems, and environments may have similar structures and limitations that are addressed by the techniques herein. In some examples, the systems provided herein may enable delivery of targeted content to a browser of a user. Though described herein with respect to advertisements in various places, the techniques herein may be used for other content besides advertisements.

The Protected Audience API proposes a privacy sandbox that enables advertisers and advertising service providers to deterministically target users without the use of third-party cookies or other user-tracking mechanisms. The Protected Audience API enables on-device auctions that are run by the browser, and selects relevant advertisements based on websites the user has previously visited. Because the auction takes place on the user's device and selects from advertisements and websites that had previously been cached in the browser, it eliminates the need to use a third-party cookie on the server-side to select relevant ads for the user.

Instead, advertisements are placed in user's browsers inside an "interest group" which is a collection of advertisements that are relevant to a particular audience. This interest group may persist on the user's browser for a period of time, meaning an advertisement can participate in an advertisement auction for up to the full length of the period of time after it was initially added to the user's browser. While the time period window gives advertisers a long timeframe in which they can target users based on interest groups, it also presents the challenge of how to handle stale data contained within the interest group and its advertisements. To solve the problem of interest group data becoming stale, the Protected Audience API uses a trusted server. A trusted server is a key-value store that enables advertisers to provide real-time data that is required for buyers to produce bids and for sellers to select winning bids in on-device auctions. The trusted server also introduces constraints and limitations on use and access to data and information. For example, the Protected Audience API places limitations on how advertisers or advertisement providers can provide real-time data, such as advertising budget, into the on-device auction. Accordingly, the techniques provided herein provide for managing a total spend of advertisements served through the Protected Audience API or other similar technologies, systems, and/or environments. Specifically, the techniques enable controlling and/or limiting an amount of spending through the Protected Audience API as a configurable percentage of the advertisements total budget. Further, the techniques provide for controlling the pacing of the advertising budget spending rate to meet a spending target and/or configuration while also ensuring that a total budget cap is not exceeded through the on-device bidding.

In order to uphold the privacy preserving goals of Protected Audience API, there are strict limitations placed upon the trusted server. The specific restrictions include that it may be a simple key value store. Because of the key value store, other systems may be able to write data about each advertisement or interest group into the key value store, and the browser is allowed to read from it. The system may request information from the trusted server to retrieve the values for a particular interest group. This request results in reading the values from the key value store and returning them to the browser. No real-time requests can be made by the trusted server in response to a request. Further, the limitations include that demand side platforms are allowed to write key-value data for each advertisement into the trusted server via a request. This request is the only way for the trusted server to obtain the data that it will vend to the browser. The trusted server may make no other requests and the requests may have no side effects such as per-request logging/metrics. The requests may not make a change to the data which is stored in the key value store.

A typical system for distributing a fixed amount of budget across hosts, and deducting from that budget for every bid does not work for the Protected Audience API because every browser acts as its own bidder and so the bid is actually produced on the device, not the server, and there is no direct feedback mechanism from the locally executed auction back to the trusted server that holds the budget data as the browser may only read data, not write data to the trusted server. Further, because the requests to the trusted server may not produce side effects and cannot result in a change to the data in the trusted server, therefore, the request cannot deduct from the total allowed budget stored in the trusted server.

This means that the budget data stored in the trusted server may be accessed an unlimited number of times between refresh cycles. The budget signal that the trusted server can provide to the bidding function is binary, either the advertisement has enough budget to bid, or it doesn't. The systems and techniques provided herein work within the advertising environment of the Protected Audience API to provide control of delivered advertisements to browsers.

The expectations of the demand-side platform can include reaching delivery and performance goals of a campaign and executing a budget spending plan. Reaching delivery and performance goals may include using a budget to have an extensive reach while meeting campaign performance goals. For example, in performance driven campaigns, the expectation may be to meet a performance goal while spending as much budget as possible. Execution of a budget spending plan usually includes goals of having a sustainable impact, increasing synergy with other medias, and distributing ads smoothly throughout a purchased period in order to reach a wider range of audiences. For example, an advertiser may expect a budget for a campaign to be spent evenly throughout time slots of the campaign.

It is increasingly challenging to meet the aforementioned expectations, especially meeting them simultaneously. Additionally, a campaign can have its own budget, budget spending plan, targeted audiences, and performance goals. Also, an increasing number of demand-side platforms compete with each other to acquire inventory through auctions, which can cause price elasticity and bid landscape between demand and supply to change frequently.

Additionally, with regard to pacing, advertisers look for maximizing campaign performance goals within budget schedules. Often customers prefer to impose delivery constraints to spend budget consistently and reach a wider range of audiences, and still have a sustainable impact on audiences. Also, since impressions and clicks are traded through auctions across many advertising exchanges in a demand-side platform, pricing on impressions and clicks can change rapidly and dynamically, as can the supply and demand for advertising opportunities online. Therefore, it can be challenging to perform pacing control and maximize the campaign performance simultaneously.

The techniques described herein provide for a control system that provides the desired response by controlling its output. In particular, using a closed loop system where feedback is fed into the system, so that action can be taken based on the current state and the desired state of the system within the constraints of the Protected Audience API. The key idea with the closed loop system is that the system first measures the current state, and then takes an action based on the current state compared to your desired state. This ensures that the system only takes an action that will push the system closer to the desired state, or remain at the desired state if already there.

The system herein is provided for determining a target budget for each advertisement, track the actual budget consumption of each advertisement based on impression data, and then use the error between the target and actual budget consumption to control the output of the system via a budget allowance in the trusted server. This system provides a controller, such as a PID controller or other controller type that adjusts the budget allowance of each advertisement based on real-time feedback and allows smooth delivery of a target budget across each advertisement.

The budget control system relies on knowing a target budget for each advertisement in the various interest groups. The system will then aim to spend a particular percent or amount of a budget, where the percentage is controllably adjustable. The system also uses a feedback system to calculate the actual budget spent. For instance, a report win function receives a notification of every winning bid for an advertisement. The input from the reported wins may be used to measure the real-time spending for each advertisement and then stores the cumulative spending over time. The feedback can be used to measure the error in the system. Then given the measured error for the advertisement's budget consumption, the control system may be used to control the bidding function's ability to spend budget based on that error.

The techniques for controlling the budget and advertisement delivery begins with determining a target hourly, daily, or other time period budget for each advertisement line. In some examples, the target rate can be determined as one that aims to evenly spread the budget across the duration of the campaign. In other words, the system may implement a smooth delivery profile regardless of the advertiser's configured delivery profile for advertisement impressions. In some examples, other estimates or methods for determining the target budget may be used.

The feedback into this system may be returned through a report win API that is invoked every time an auction is won. This provides a number of impressions per ad, and the dollar amount spent on each impression thereby enabling calculation of the error for the budget. In the system described herein, the budget can be tracked over time for each advertisement to calculate errors (instantaneous, integral, and derivative). Such information, impression data and other such data, may be collected for each advertisement associated with the interest group and can output a monetary amount spent for the impression, for example expressed in milli-cents.

The error, calculated based on the system feedback, can be determined using basic calculations of time series data and metrics. The error can be used to produce a control value for controlling delivery of the advertisement. The error is calculated by determining a total target budget as well as a budget for one or more time periods based on advertisement configuration data from an advertisement provider. The total target budget can be multiplied by a budget consumption percentage stored in a configuration service. Next, the system determines that the total spend cap has not been met. The system can check a total cumulative budget and if consumed, stop bidding with that advertisement. In the event that the total cumulative budget cap has been met, the system can stop calculating error, as the system will no longer allow any budget to be spent for this advertisement. The error calculation, the calculation of difference between the amount of budget to spend and a target budget to spend with what has been or is currently being spent, can be used to control delivery of advertisements to maintain delivery of the advertisement in conjunction with the targets from the advertiser as established for the campaign. The system then controls the output or delivery of advertisements for bidding at the browser based on the observed error.

As explained above, the trusted server is the source of real-time data that is fed into the bidding function of the browser. The interaction between the browser, trusted server, and the bidding function that is responsible for producing bids includes initiating an auction. This includes making a request to the trusted server to fetch values of the keys defined in the interest group. These keys correspond to each advertisement in the interest group, and the values returned contain all the information that the bidding function needs to filter, rank, and price each advertisement. The bidding function operates on each advertisement in the interest group, and it relies on the data returned from the trusted server to make decisions about which advertisement it will produce a bid for—as it can only produce one bid for the interest group so it must select between all advertisements in the interest group and choose only one to bid with.

The bidding function filters its list of advertisements associated with the interest group to filter out any advertisements that are not eligible to bid. For example, the bidding function may filter out any advertisements that did not receive a response from the trusted server. In other words, if the trusted server does not return metadata for a particular advertisement, that advertisement will not be considered as eligible to participate in the browser auction. In some examples, if an advertisement doesn't have any remaining budget to bid, the advertisement may be removed from the trusted server so that it is always filtered out of the list of eligible ads by the bidding function.

The eligible advertisements from the key value store of the trusted server may be determined based on the control variable output of the control system. For example, the control system outputs a scalar value (the control value) which indicates how to control the budget. When the scalar value is large, then the system will attempt to spend more budget, and when it the scalar value is small the system will attempt to spend less. The control system produces the control value that may be used to produce a stable delivery budget to meet the target budget. However, the output of the control system may be output as an analog signal, indicating that the budget allocation for each advertisement should be turned up or down. However, the trusted server only works in two modes: 'on' or 'off.' The binary value for the trusted server can't be scaled in accordance with the control value output by the control system. Instead, the system can convert the analog signal to a binary signal, where the average output is proportional to the control value.

One such control mechanism may include use of pulse width modulation (PWM) as a method of controlling the total output of the system that operates in binary modes given an analog output value. Initially, the system may define a cycle length, such as one minute. The system may then turn on the bidding via the trusted server for a period of time, then turn it off for a period of time. The ratio of time spent on compared to the entire cycle time should equal the analog value. This ratio of the time spent 'on' is referred to as a duty cycle, and the average output of the system relative to its maximum output is equal to the duty cycle.

Accordingly, the trusted server values may be updated over a time period, such as ten seconds, twenty seconds, thirty seconds, one minute, or other such time periods. The control value that defines how to control the budget is the analog value. It is scaled to between 0 and 1 such that the value will be 0 when the system should not deliver any budget, and 1 when the system should deliver as much budget as possible.

In a particular example, the time period (e.g., 60 seconds) may be multiplied by the control value to determine the number of seconds in a minute that the advertisement will be allowed to bid. After determining the duty cycle for the particular time period, the system may update the trusted server's value for the advertisement, such as by setting timestamp data to allow bidding for the 'on' portion of the duty cycle and the record to be deleted, removed, or otherwise ineligible for the remainder of the duty cycle, the 'off' portion. In the example, the control value may be 0.25 over a time period of one minute, indicating an 'on' time of 15 seconds and off time of 45 seconds. During the first 15 seconds (or any 15 second period of the time period), the bidding function receives values from the trusted server and is allowed to bid on that advertisement. During the next 45 seconds, that ad will not return a value from the trusted server, and will thus be filtered out by the bidding function and not be allowed to bid.

Using the control system described herein, the system may provide for delivery of advertisements for bidding to keep within budget constraints and meet advertiser configuration settings for a particular ad campaign. This provides an advertiser budget control system designed to work within the confines of a privacy preserving targeted ad system and the limitations such an environment places on the trusted server. Specifically, it provides for user of a control system, such as a PID controller with pulse width modulation of budget delivery error rates to stably deliver advertiser budget while also ensuring prevention of over-spending of the advertiser budget. The control system provided herein gives numerous benefits over existing control systems for delivery of ads. For example, the control system provides for flexible and customizable delivery of advertisements according to an advertising budget and constraints set by an advertiser in real-time. The systems provided herein enable such calculations and determinations in real-time, which could not be performed manually, and thereby provide for targeted ads in a system that protects privacy of user data from third-party providers.

A system can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. The operations may include determining a control value for a first advertisement of a first set of advertisements by determining budget data for the first advertisement may include a time window and a first amount to target spending during the time window, determining budget consumption data for the time window describing a second amount spent during the time window, and determining the control value based on an error value between the budget data and the budget consumption data. The operations also include determining a key value for the first advertisement based on the control value, the key value describing availability of the first advertisement for bidding and pricing information for the first advertisement and storing, in a trusted server for an advertising environment including the first advertisement, the key value associated with the first advertisement. The operations further include determining an interest group associated with a browser instance, the interest group defined based on previous activity at the browser instance and describing a privacy-preserving set of interests for the browser instance for delivering targeted advertisements to a user and conveying a request to the trusted server for key values associated with a second set of advertisements associated with the interest group. The operations also include receiving, from the trusted server, the key values and generating a bid by generating a third set of advertisements by filtering the second set of advertisements to remove one or more advertisements that are not eligible to bid based on the key values, and ranking the third set of advertisements based on the key values. The operations also include providing a second advertisement of the third set of advertisements for display at the browser instance based at least in part on the bid. Other embodiments of this aspect include corresponding computer systems, apparatus, and computer programs recorded on one or more computer storage devices, each configured to perform the actions of the methods.

In some examples, determining the key value based on the control value may include converting the control value to a pulse-width modulation control signal by defining a cycle time, determining a scalar having a value between zero and one, the scalar based on the control value, multiplying the cycle time by the scalar to determine an advertisement availability time, where the first advertisement is eligible to generate the bid during the advertisement availability time, and storing the advertisement availability time with the key value at the trusted server. In some examples, determining the control value further may include determining, based on the budget consumption data, that a total budget cap for the first advertisement has been met, and determining the control value to indicate the first advertisement is not eligible in response to the total budget cap being met. In some examples, determining the control value based on the error value may include inputting the budget data and the budget consumption data into a PID controller.

FIG. 1 illustrates a system 100 for providing on-device advertising auctions to remain at or within advertising budget constraints in real-time within a privacy-preserving advertising environment. The system 100 includes user devices 102 that host a browser 104. The browser 104 includes components for hosting advertisements, such as ad space 106, as well as an auction component 108 for hosting on-device auctions for advertisement placement within the browser 104.

The system 100 further includes a trusted server 110. As explained above, the trusted server 110 is the source of real-time data that is fed into the auction 108 of the browser 104. The interaction between the browser 104, trusted server 110, and the auction 108 that is responsible for producing bids includes initiating an auction. This includes making a request to the trusted server 110 to fetch values of the keys defined in the interest group (e.g., as defined by the interest group service 114). These keys correspond to each advertisement in the interest group, and the values returned contain all the information that the auction 108 needs to filter, rank, and price each advertisement. The auction 108 operates on each advertisement in the interest group, and it relies on the data returned from the trusted server 110 to make decisions about which advertisement it will produce a bid for—as it can only produce one bid for the interest group so it must select between all advertisements in the interest group and choose only one to bid with.

The system 100 also includes a component for report win 112. The report win 112 is used to provide feedback to the system 100 when an auction is won for placement of an ad. This provides a number of impressions per ad, and the dollar amount spent on each impression thereby enabling calculation of the error for the budget. In the system described herein, the budget can be tracked over time for each advertisement to calculate errors (instantaneous, integral, and derivative). Such information, impression data and other such data, may be collected for each advertisement associated with the interest group and can output a monetary amount spent for the impression, for example expressed in milli-cents. the data from the report win 112 is collected at the interest group service 114 for use in providing data to the data provider 120 that may be useful for refining the delivery of advertisements for bidding based on budget control as described herein.

The system 100 also includes an interest group service 114. The interest group service 114 may be used to group advertisements are placed in user's browsers inside an "interest group" which is a collection of advertisements that are relevant to a particular audience. This interest group may persist on the user's browser for a period of time, meaning an advertisement can participate in an advertisement auction for up to the full length of the period of time after it was initially added to the user's browser. While the time period window gives advertisers a long timeframe in which they can target users based on interest groups, it also presents the challenge of how to handle stale data contained within the interest group and its advertisements.

The system 100 also includes an advertiser configuration 116. The advertiser configuration 116 may include different types of configuration, such as to measure budget based on monetary value or impressions. Monetary budgets have an amount property which represents the dollar amount advertisers wish to spend denoted in millicents. Impression budgets amount property represent the number of impressions they wish to serve. When stored by the interest group service 114, they may be stored in a table with ad budget information including the budget type so that a pacing algorithm can handle either type of budget. Additionally, we will store the advertisement's start date to aid in checking the total spend cap for the campaign's duration.

The system 100 also includes budget information 118. The budget information 118 may be used for various budget determinations such as target budget, remaining budget, consumed budget, etc. To determine a target budget the system 100 may multiply the total budget by a configurable value which allows the system 100 to control the percentage of ad budget to be consumed. This information may be stored in the advertiser configuration 116 which allows the system to apply different budget consumption values to different advertisers or entities. The system 100 enables control at the entity level and advertiser level. In scenarios where there are conflicts between the entity value and an advertiser value, the more specific control wins (e.g., the advertiser setting overrides the entity setting).

The auction 108 filters its list of advertisements associated with the interest group to filter out any advertisements that are not eligible to bid for the ad space 106. For example, the auction 108 may filter out any advertisements that did not receive a response from the trusted server 110. In other words, if the trusted server 110 does not return metadata for a particular advertisement, that advertisement will not be considered as eligible to participate in the browser auction. In some examples, if an advertisement doesn't have any remaining budget to bid, the advertisement may be removed from the trusted server 110 so that it is always filtered out of the list of eligible ads by the auction 108.

The eligible advertisements from the key value store of the trusted server 110 may be determined based on the control variable output of the system 100. For example, the system 100 (e.g., the data provider 120) outputs a scalar value (the control value) which indicates how to control the budget. When the scalar value is large, then the system will attempt to spend more budget, and when it the scalar value is small the system will attempt to spend less. The system 100 produces the control value that may be used to produce a stable delivery budget to meet the target budget. The data provider 120 may then provide control data to the trusted server 110 for determining eligibility for bidding for the ad space 106 within the auction 108.

Using the control system described herein, the system 100 may provide for delivery of advertisements for bidding to keep within budget constraints and meet advertiser configuration settings for a particular ad campaign. This provides an advertiser budget control system designed to work within the confines of a privacy preserving targeted ad system and the limitations such an environment places on the trusted server. Specifically, it provides for user of a control system, such as a PID controller with pulse width modulation of budget delivery error rates to stably deliver advertiser budget while also ensuring prevention of over-spending of the advertiser budget. The control system provided herein gives numerous benefits over existing control systems for delivery of ads. For example, the control system provides for flexible and customizable delivery of advertisements according to an advertising budget and constraints set by an advertiser in real-time. The systems provided herein enable such calculations and determinations in real-time, which could not be performed manually, and thereby provide for targeted ads in a system that protects privacy of user data from third-party providers.

Accordingly, the system 100 provides improvements for computing environments and systems by enabling targeted advertising on devices and within browsers without collection of third-party cookies and other tracking information. The system 100 improves the performance of computing systems by additionally enabling on-device advertising auctions, thereby reducing signals and transmissions between devices, which reduces latency, reduces processing time, reduces processing load on servers, and reduces network traffic and signal transmissions.

Figure 2:
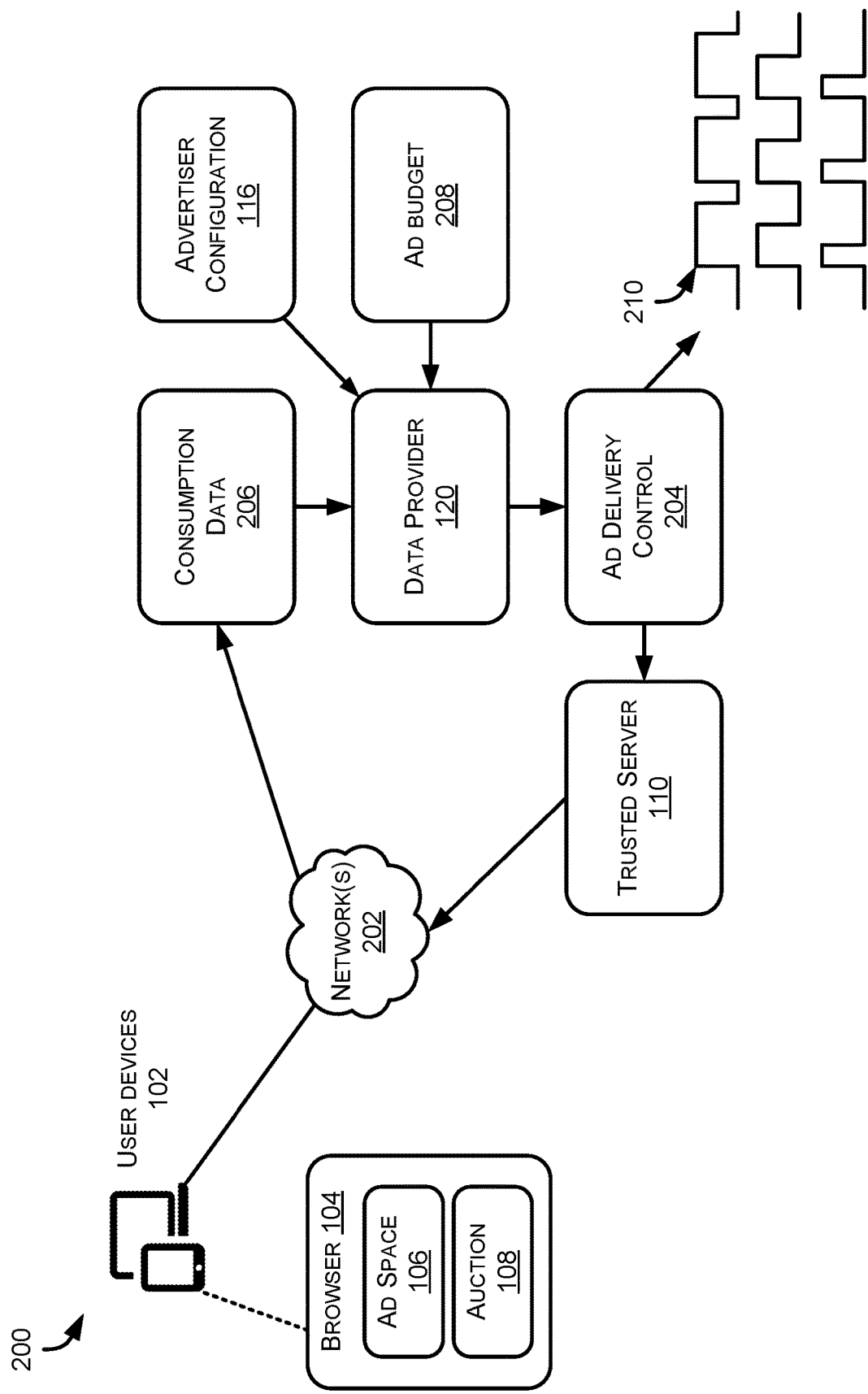
FIG. 2 illustrates a system for controlling on-device advertising auctions to remain at or within advertising budget constraints in real-time within a privacy-preserving advertising environment.

FIG. 2 illustrates a system 200 for controlling on-device advertising auctions to remain at or within advertising budget constraints in real-time within a privacy-preserving advertising environment. The system 200 includes user devices 102 that host a browser 104. The browser 104 includes components for hosting advertisements, such as ad space 106, as well as an auction component 108 for hosting on-device auctions for advertisement placement within the browser 104. The user devices 102 communicate with the trusted server 110 over a network 202. In this manner, the trusted server 110 may be located a central location, such as a data center or service provider as described with respect to FIGS. 7 and 8 herein. The trusted server 110 receives data from the data provider 120 (e.g., through the ad delivery control 204), which may perform the calculations for control values for the particular advertisements. The data provider 120 may be used to determine key values that determine eligibility for the advertisements to bid for the ad space 106. Further, the data provider 120 may determine consumption data 206 based on ads bid and placed within the browser 104. The data provider 120 may also determine remaining budget based on the consumption data 206 and the advertising budget 208 and the advertiser configuration 116 as described above with respect to FIG. 1. For instance, the data provider 120 may determine remaining budget by multiplying a percentage of consumption data 206 by the ad budget 208.

As described herein, the system 200 provides for control of delivery of advertisements based on budget control systems. In the system 200, the trusted server 110 may store key value data for the advertisements that relates to ad delivery control 204 to the browser 104. The ad delivery control 204 may provide for control of the budget via control of when the particular advertisements are available for bidding through the auction 108. The system 200 provides for calculation of error based on the system feedback (e.g., via the data provider 120), that can be determined using basic calculations of time series data and metrics. The error can be used to produce a control value for controlling delivery of the advertisement and thereby control of the advertisement budget. The error is calculated by determining a total target budget as well as a budget for one or more time periods based on advertisement configuration data from an advertisement provider. The total target budget from the ad budget 208 can be multiplied by a budget consumption percentage stored the consumption data 206.

Next, the system determines that the total spend cap has not been met. The system can check a total cumulative budget and if consumed, stop bidding with that advertisement. In the event that the total cumulative budget cap has been met, the system can stop calculating error, as the system will no longer allow any budget to be spent for this advertisement. The error calculation, the calculation of difference between the amount of budget to spend and a target budget to spend with what has been or is currently being spent, can be used to control delivery of advertisements to maintain delivery of the advertisement in conjunction with the targets from the advertiser as established for the campaign. The system then controls the output or delivery of advertisements for bidding at the browser based on the observed error.

The output of the ad delivery control 204 may be output as an analog signal, indicating that the budget allocation for each advertisement should be turned up or down. However, the trusted server 110 only works in two modes: 'on' or 'off'. The binary value for the trusted server can't be scaled in accordance with the control value output by the ad delivery control 204. Instead, the ad delivery control 204 can convert the analog signal to a binary signal, where the average output is proportional to the control value.

One such control mechanism may include use of pulse width modulation (PWM) by the data provider 120 and/or the ad delivery control 204 as a method of controlling the total output of the system 200 that operates in binary modes given an analog output value. Initially, the system may define a cycle length, such as one minute. The system may then turn on the bidding via the trusted server for a period of time, then turn it off for a period of time. The ratio of time spent on compared to the entire cycle time should equal the analog value. This ratio of the time spent 'on' is referred to as a duty cycle 210, and the average output of the system relative to its maximum output is equal to the duty cycle 210.

Accordingly, the trusted server 110 values may be updated over a time period, such as ten seconds, twenty seconds, thirty seconds, one minute, or other such time periods. The control value that defines how to control the budget is the analog value. It is scaled to between 0 and 1 such that the value will be 0 when the system should not deliver any budget, and 1 when the system should deliver as much budget as possible.

In a particular example, the time period (e.g., 60 seconds) may be multiplied by the control value to determine the number of seconds in a minute that the advertisement will be allowed to bid. After determining the duty cycle 210 for the particular time period, the system may update the trusted server's value for the advertisement, such as by setting timestamp data to allow bidding for the 'on' portion of the duty cycle 210 and the record to be deleted, removed, or otherwise ineligible for the remainder of the duty cycle 210, the "off" portion. In the example, the control value may be 0.25 over a time period of one minute, indicating an 'on' time of 15 seconds and off time of 45 seconds. During the first 15 seconds (or any 15 second period of the time period), the bidding function receives values from the trusted server and is allowed to bid on that advertisement. During the next 45 seconds, that ad will not return a value from the trusted server, and will thus be filtered out by the bidding function and not be allowed to bid.

Figure 3:
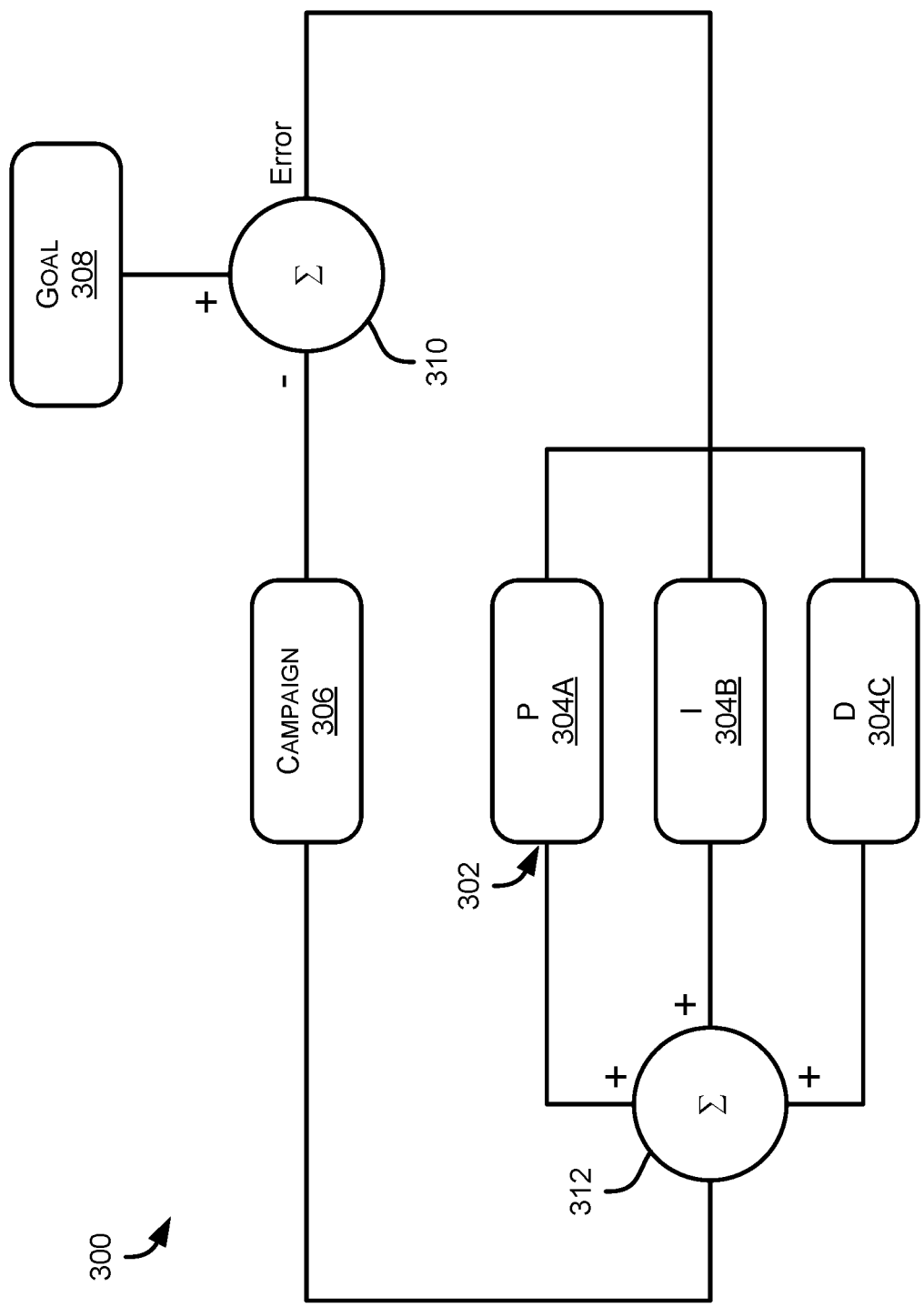
FIG. 3 illustrates an example control system for an advertising campaign using a PID controller.

FIG. 3 illustrates a control system 300 for an advertising campaign using a PID controller 302. The control system 300 may be implemented by the data provider 120 of FIGS. 1 and/or 2. The control system 300 includes a feedback loop within an example system. The control system 300, and any other controller or aspect described herein, may be implemented via circuitry, such as electronic circuitry.

An interface of the control system 300 may include inputs that can be used to calculate an error, such as the output of error function 310, which may represent some form of a difference between a measured variable from the campaign 306, such as a spending pattern, and a goal 308, such as an ad campaign budget. One task of the control system 300 can be to reduce the error value by adjusting inputs of the controlled process. The rate of reduction depends on the controller's settings, such as the values of gain coefficients Kp, Ki, and Kd corresponding to the proportional aspect 304A, the integral aspect 304B, and the derivative aspect 304C of the control system 300. The gain coefficients Kp, Ki, and Kd may be associated with one or more controllable aspects of a campaign, such as layer amounts, layer prioritization, and layer spending.

The proportional aspect 304A of the PID controller 302 may relate to real-time error, the integral aspect 304B may relate to an accumulation of past errors, and the derivative aspect 304C may be a prediction of future errors based at least on rate of change in the error value. Additionally, or alternatively, besides continuous correction and the integral form of the integral aspect 304B, the system may use a time period-based time scale and a summation 312 of the aspects 304A, 304B, and 304C (such as a weighted summation of these three aspects) to adjust one or more variables of one or more online advertising campaigns 306.

The PID controller 302 can be useful in directing adjustments to online campaigns, especially complex campaigns taking advantage of multiple online advertising channels, because time-consuming modelling and analysis may not be available to effectively tune such campaigns. By merely designing an error function and setting gain coefficients of the PID controller 302 (such as any one or more of the gain coefficients Kp, Ki, and Kd), the controller can provide direction according to process specifications. In an example, a result of the PID controller 302 can include a degree of responsiveness to an error, a degree to which the controller overshoots a pre-defined goal, and a degree of system oscillation.

In some examples, a PID controller 302 may only use one or two of the aspects 304A-304C. This can occur by setting one or two of the aspects 304A-304C to zero. Where each of the three aspects 304A-304C is implemented by circuitry, one or two of the aspects may be removed. For example, circuitry implementing a PI controller may only include circuitry for proportional and integral aspects. Alternatively, circuitry implementing a PI controller may include circuitry for all the aspects of a PID controller, but the derivative aspect is set to output zero, voided, or switched off. PI controllers are useful, since derivative action can be sensitive to noise, whereas the absence of the integral aspect may prevent a controlled campaign from reaching or even approaching its pre-defined goal.

In an example, a control loop directed by the PID controller 302 can manually and/or automatically adjust parameters of an online advertising campaign to achieve or at least approach pre-defined goals of the campaign. Results of a campaign to compare against the pre-defined goals may include analytics, such as any of the analytics described herein with respect to delivery of advertisements and budget consumption, among other analytics or advertiser configurations. The measured process variable from the campaign 306 may include the results of a campaign to be compared against the pre-defined goal 308. The pre-defined goal can include one or more set points. The control value for the campaign 306, such as a pacing rate, scalar, control value, or other such control value, which can be the output of the PID controller 302 may be referred to as manipulated variables or controlled variables, since such parameters are controlled by the PID controller 302. A difference between the output of the campaign 306 and the goal 308 is an error variable, which may be an error value or an error function. The error quantifies whether the campaign 306 is meeting its pre-defined goals and the extent that it is meeting the goals. As illustrated in FIG. 3, the PID controller 302 determines the control value, such as may be included with a key value according to the error and the proportional aspect 304A, the integral aspect 304B, the derivative aspect 304C, or any combination thereof.

In an example, the proportional aspect 304A is set in proportion to the error. The derivative aspect 304C uses a rate of change in the output of the campaign 306. The integral aspect 304B uses an average and/or accumulated output from the campaign 306 from the past. An alternative of integral aspect 304B can use change of the control value in steps proportional to the error. Over time, the steps add up the past errors (which is a discrete time equivalent to integration).

In adjusting any of the three aspects 304A-304C (such as by adjusting the Kp, Ki, and/or Kd), a change that is too large when the error is small may lead to overshoot. Where the PID controller 302 repeatedly makes changes that are too large and overshoot the goal 308, output of the PID controller may oscillate around one or more of the set points in either a constant, growing, or a decaying sinusoid. In examples wherein the amplitude of the oscillations increases with time (i.e., the sinusoid is growing) the campaign is unstable. If the amplitude of the oscillations decreases, the campaign is stable. If the oscillations remain at a constant amplitude, the campaign is marginally stable.

In an example, the PID controller 302 may dampen anticipated future oscillations by tempering its adjustments, or reducing a controller gain. This may cause a gradual convergence towards the goal 308. If the PID controller 302 starts from a stable state with zero error, then adjustments to the controller can be in response to changes in other measured or set inputs to the campaign that affect the campaign, and hence the output from campaign 306. Variables that affect the campaign other than the output of the summation 312 are known as disturbances. The PID controller 302 may reject disturbances.

The PID controller 302 can output control values, such as may be included in a key value of the trusted server 110. The control value may be determined as a summation of the aspects 304A-304C. For example, for a control value u (t), the summation may be represented as $$u(t) = K_p e(t) + K_i \int_0^\tau e(t)dt + K_d \frac{d}{dt}e(t),$$

where Kp is a proportional gain coefficient, Ki is an integral gain coefficient, Kd is a derivative gain coefficient, e (t) is an error at a given time, and t is the given time.

The proportional aspect 304A can generate and output a value that is proportional to the error in real time. The output of the proportional aspect can be adjusted by multiplying the error in real time by the gain coefficient Kp, also referred to as the proportional gain constant. The proportional aspect 304A may be calculated by measuring the hourly consumed budget compared to the hourly target budget. The system 100 can retrieve the total budget spent for an advertisement within the last hour by making a request, using a period of 1 minute, for example. This request will return an array of 60 data points which can be summed to get the actual budget consumed during the last hour. When the budget type for an ad is monetary, the system 100 may request a total dollar amount spent during the last hour (in milli-cents). When the budget type is measured in impressions, the system 100 may request a sample count statistic to get the total number of impressions. The control system 300 may calculate the error by subtracting the actual budget consumed during the campaign 306 from the target budget 308, and multiply by the proportional gain coefficient (Kp) determined during tuning of the system.

A relatively high proportional gain can result in a large change in u (t) for a given change in the e (t). As mentioned herein, if the proportional gain is too high, the system can become unstable. A relatively small gain can result in a small change in u (t) for a given change in e (t), and a less responsive controller. If the proportional gain is too low, the response by the PID controller 302 may be too small in response to disturbances. The proportional aspect 304A can be weighted to have a greater effect on u (t) than the other two aspects 304B and 304C.

The integral aspect 304B can accelerate the direction of the campaign towards the goal 308 and can reduce a residual steady state error that can occur with a control system 300 with just an operating proportional aspect. A tradeoff to this acceleration can include the output of the campaign 306 overshooting the goal 308.

The integral aspect 304B need not actually perform integration to arrive at the integral term since the control system 300 deals with discrete datapoints rather than a continuous function. The integral term can be calculated by summing all of the errors over a time period. In an example, the control system 300 may use a lookback window of one day for calculating the integral term in order to account for errors made over the past day when deciding how much budget to allocate for the current time period. This allows the control system 300 to "catch up" for cyclical patterns in budget delivery—for example serving fewer advertisements than desired at night.

The integral term is calculated as the sum of the error in each hour over the past day or other time period. The control system 300 may determine the integral term by requesting metrics from the trusted server using a time period. This may return an array of data points representative of the error per hour over the last day or other time period which can be summed together to arrive at the total error in the last day.

The contribution from the integral term can be proportional to a magnitude of the error and/or duration of the error. The integral aspect 304B can include a summation of error over time and can provide an accumulated offset to the proportional aspect 304A. The accumulated error can be multiplied by an integral gain, such as the gain coefficient Ki, and added to the output of the PID controller 302.

The derivative term is a measure of how quickly the error is changing (and in which direction). The derivative component tends to be very sensitive to noise in the system, a small change in error but in a short time frame can result in an unnecessarily large contribution from the derivative component as it is not concerned with the magnitude of the error, but rather the rate at which it changes. In order to soften the effect of the derivative term in the calculation, the control system 300 can take the derivative over an hourly error rather than the per minute data points.

The derivative term used in the PID controller 302 is commonly dropped, leaving a PI controller due to the derivative component being very sensitive to noise. The control system 300 may leave Kd at 0, giving a PI controller for the control system 300 based on the outcomes of testing and a tuning process.

The derivative aspect 304C can determine a derivative of the process error in real time by determining the slope of the error over time and multiplying this rate of change by a derivative gain, such as the gain coefficient Kd. The derivative aspect 304C can be set at zero or weighted to have a lower effect on u (t) than the other two aspects 304A and 304B. The derivative aspect 304C can provide a prediction on future campaign behavior and the PID controller 302 can use that prediction to improve settling time and stability of the campaign. In an example where the derivative aspect 304C is used, the PID controller 302 can include a low pass filter associated with the derivative aspect. The low pass filter can limit the high frequency gain and noise that obfuscate the output of the derivative aspect 304C.

The PID controller 302 uses all three terms to calculate a control value, which is the number that actually influences the budget controller. For each advertisement, the system will request the desired metrics, and all three of the terms can be requested in a single request and requests for multiple ads can be combined together into a single request. With all of the data, the summation of the terms provides the control value.

The control value may then be normalized to be a value between 0 and 1 such that the control value approaches 1 when the error is large, and the control value approaches 0 when the error is small (or negative).

The parameters for the PID controller 302 may be tuned for performance of the PID controller 302. The constants, Kp, Ki, and Kd are multiplied by the measured error values to produce a weighted sum of the P, I, and D components to arrive at the control value. These constants are parameters which may be tuned to control the output and stability of the control system 300. There are well-known heuristics for tuning these parameters which may be followed for the control system 300.

In some examples, a priority for the system may be to reduce the risk that the system spends more advertiser budget than intended or allocated. With that priority, the system may implement several mechanism to ensure that the on-device auction budget does not over-spend the target budget. For example, the system may ensure that a total budget cap is not met or exceeded. For instance, prior to calculating the hourly error, the system may check to see if the total spend cap has been met. If the spending cap has been met, then the system does not allow any further budget to be spent by the system.

The system may leave the advertisement in the interest group, even after the spend cap has been met. Maintaining this arrangement enables the system to re-evaluate the spend cap if the budget or budget consumption or configuration changes during the ad campaign.

In another example, the system may evaluate for throttling of trusted bidding signals requests. In some examples, there is a risk that a large spike in the number of on-device auctions within a single refresh cycle (1 minute) could result in overspending on an advertisement's budget in a very short time frame. For example, if the system were to suddenly get 1 million requests in one minute when the average is 1 thousand requests per minute, the PID controller 302 would not handle such a large shock until the next refresh cycle. This risk may be mitigated by applying request throttling for trusted bidding signals requests at a gateway of the trusted server. The system may throttle requests based on the interest group making the request. The throttling may allow at most 10,000 requests per minute per interest group. This throttling may ensure that any advertisement could not possibly spend more than in a single refresh cycle, and provide a margin of safety that balances budget protection with a desire to deliver the budget in full.

In some examples, the system may face additional risk that values in the trusted server may not be updated in time. The system operates on an assumption that the system will re-evaluate the budget every minute and update the trusted server on time. The risk may be that for advertisements which had been under delivering we would apply the maximum control value to the budget (in other words do not restrict budget for the next minute). If the trusted server were not updated then the budget consumption would not be accurately controlled. To prevent this from happening, the system may implement a timestamp on every advertisement in the trusted server, and the maximum timestamp or operational time period may be set to the refresh-cycle time (e.g., one minute).

Figure 4:
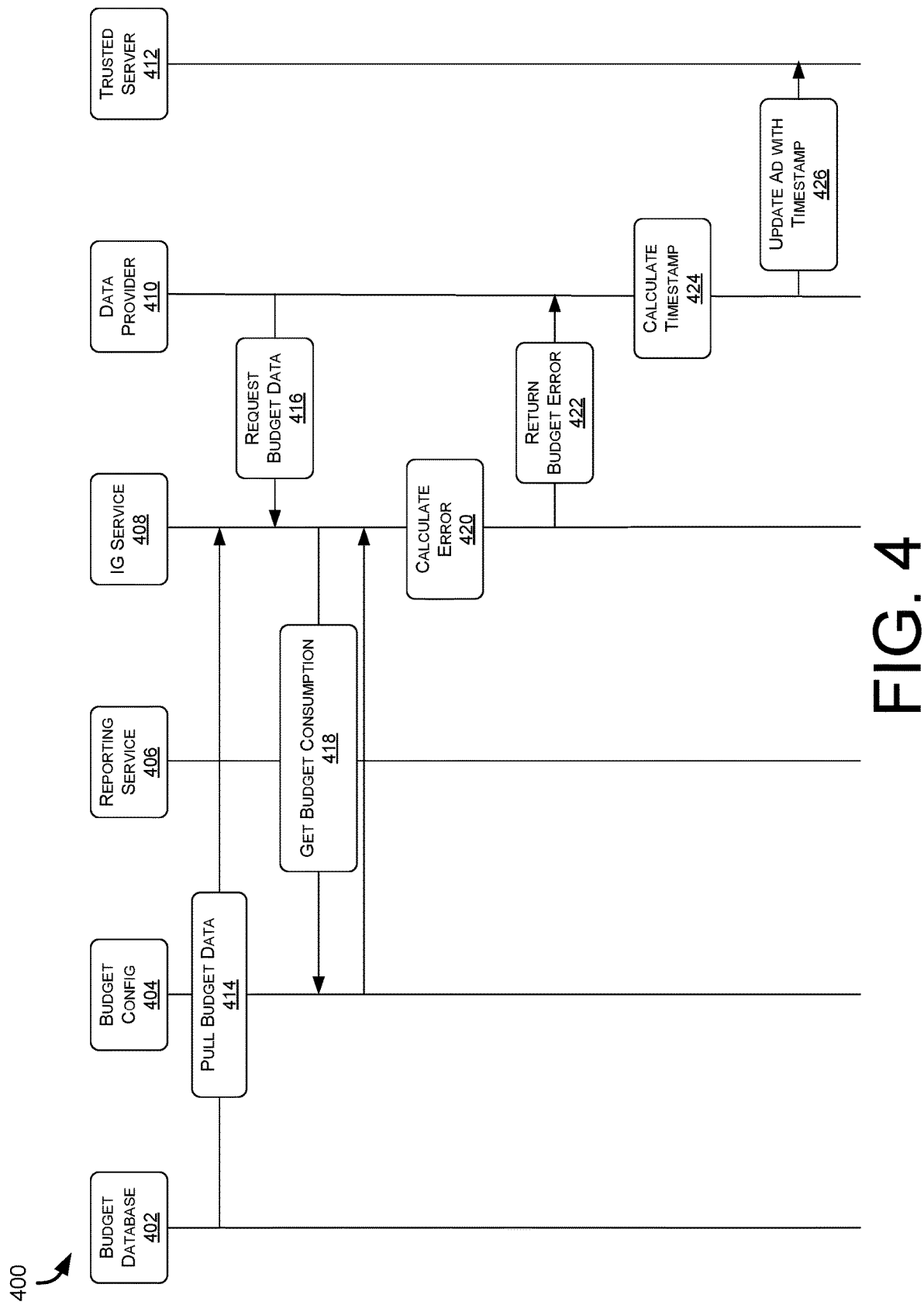
FIG. 4 illustrates a diagram of signals between system components for updating key values on a trusted server for advertising auctions on-device within budget constraints.

FIG. 4 illustrates a diagram 400 of signals between system components for updating key values on a trusted server for advertising auctions on-device within budget constraints. The diagram 400 includes representations of a budget database 402, budget configuration 404, reporting service 406, interest group service 408, data provider 410, and trusted server 412. The budget database 402 may include the budget information 118 and information related to the ad budget 208 from FIGS. 1-2. The budget configuration 404 may include the information and/or systems of the advertiser configuration 116 of FIG. 1. The reporting service 406 may include the report win 112 system for reporting auction win data. The interest group service 408 may be similar and/or identical to the interest group service 114 of FIG. 1. The data provider 410 may be similar or identical to the data provider 120 of FIG. 1. The trusted server 412 may be similar or identical to the trusted server 110 described herein.

Initially, the budget data may be pulled at 414 from the budget database 402 to the interest group service 408. The data provider 410 may then request the budget data at 416. Further, at 418, the diagram 400 includes receiving the budget consumption from the budget configuration 404 to the interest group service 406. The budget consumption may represent a portion of the budget that has already been consumed during an advertising campaign. At 420, the interest group service 408 calculates error, the error calculated as described herein, based on a difference between a goal or target budget consumption rate versus an actual budget consumption rate.

The data provider 410 receives the budget error at 422 as calculated, for example according to the control system 300 of FIG. 3. The data provider 410 may then calculate a timestamp at 424, including a start and stop time for the advertisement to be bid on. The bidding may be eligible during the time window defined by the timestamp and ineligible outside of the time window. The timestamp data may then be updated from the data provider 410 to the trusted server 412 at 426.

Figure 5:
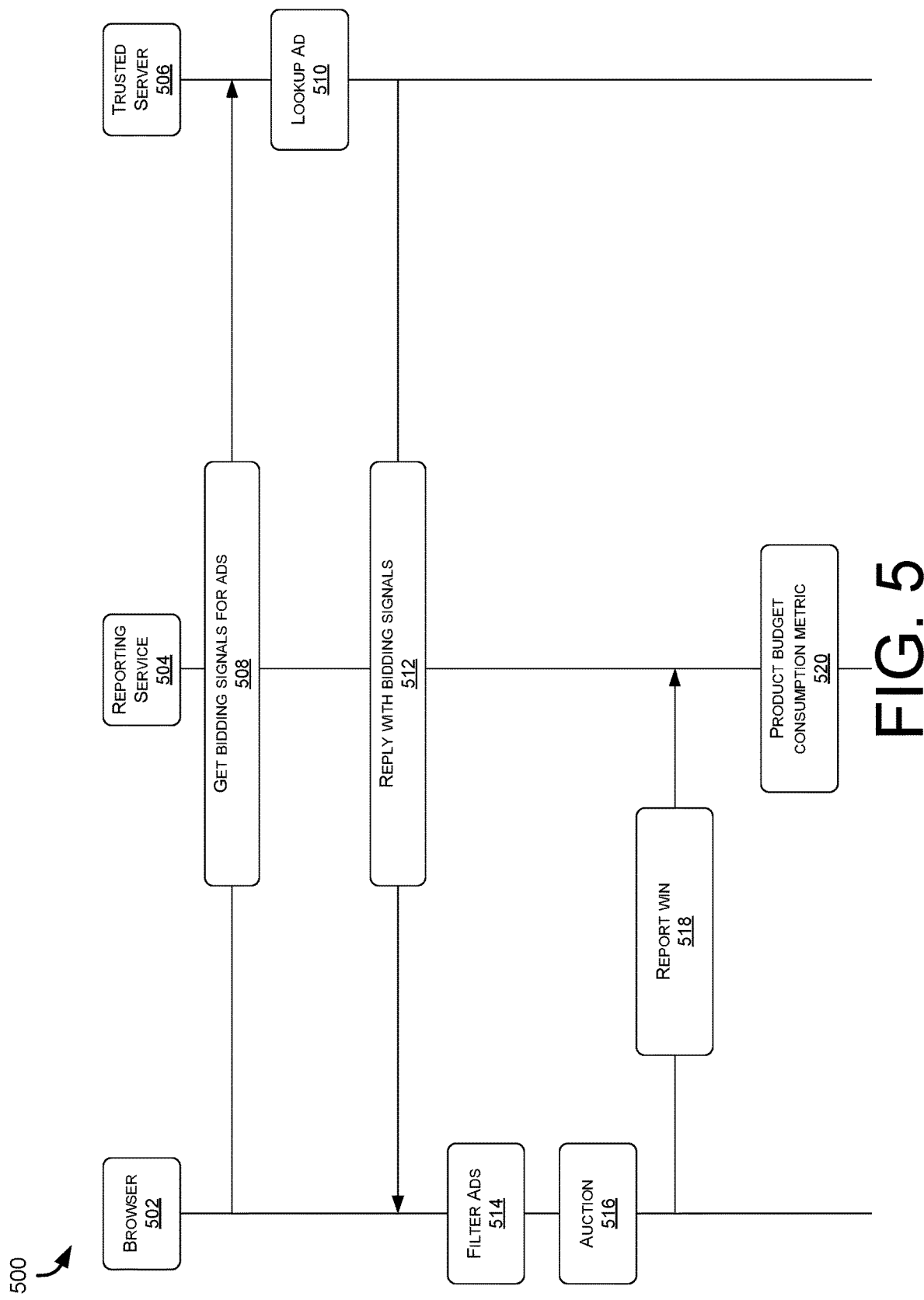
FIG. 5 illustrates a diagram of signals between system components for providing control of advertising budgets in on-device auctions.

FIG. 5 illustrates a diagram 500 of signals between system components for providing control of advertising budgets in on-device auctions. The diagram 500 includes the browser 502, a reporting service 504, and a trusted server 506. The browser 502 may be similar or identical to the browser 104 of FIG. 1. The reporting service 504 may be similar or identical to the report win 112 of FIG. 1. The trusted service may be similar or identical to the trusted server 110 described herein.

At 508, the diagram illustrates that the trusted server 506 receives bidding signals for advertisements. The bidding signals may indicate interest group indication and may also include signals for key values of eligible ads that may be filtered for bidding at the browser. The diagram 500 may include 510 looking up advertisement data from the key value table. The key value table may include indications of eligibility, bidding configurations, and other such data. The trusted server 506 may return the bidding signals to the browser 502 at 512.

At 514, the browser 502 may filter the ads based on the bidding signals received from the trusted server 506. The filtering may be performed as described herein, for instance, to filter out ads that are ineligible based on budget control value parameters described herein. At 516, the browser holds an auction to determine a winning bid for a winning advertisement to place within the browser.

After the auction at 516, the browser 502 reports the win at 518 to the reporting service 504. The reporting service 504 may determine a product budget consumption metric at 520. The budget consumption metric may be used to update the data at the trusted server 506, for example to indicate the amount of budget consumed for the particular advertisement.

Figure 6:
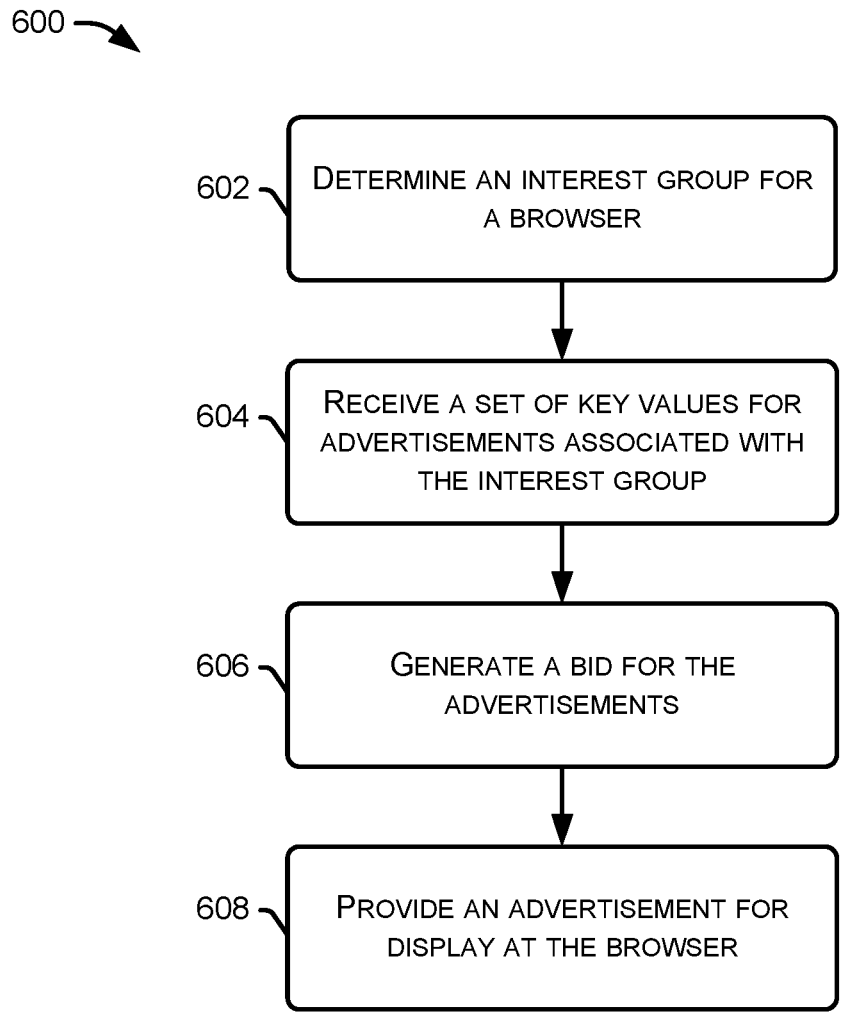
FIG. 6 illustrates a flow diagram for controlling advertising budgets during on-device advertising auctions.

FIG. 6 illustrates a process for implementing controlling advertising budgets during on-device auctions for advertisements. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 6 illustrates a flow diagram for controlling advertising budgets during on-device advertising auctions. The flow diagram depicts a process 600 that may be implemented for control of the advertisements based on budget control parameters. At 602, the process 600 includes determining an interest group for a browser. The interest group may be defined based on previous activity at the browser. This interest group may persist on the user's browser for a period of time, meaning an advertisement can participate in an advertisement auction for up to the full length of the period of time after it was initially added to the user's browser.

At 604, the process 600 includes receiving a set of key values for advertisements associated with the interest group. The set of key values may be received from a trusted server. The set of key values may be associated with a set of advertisements associated with the interest group, the set of key values determined based on target budget data and budget consumption data for the set of advertisements, the set of key values describing availability and pricing information for the set of advertisements.

The set of key values may be determined by determining the target budget data for the set of advertisements may include a time window and a first amount to target spending during the time window: determining the budget consumption data for the time window describing a second amount spent during the time window; determining a control value based on an error value between the target budget data and the budget consumption data; and determining a key value of the set of key values further based on the control value.

Determining the key value based on the control value may include converting the control value to a pulse-width modulation control signal by: defining a cycle time: determining a scalar having a value between zero and one, the scalar based on the control value: multiplying the cycle time by the scalar to determine an advertisement availability time, where the advertisement is eligible to bid during the advertisement availability time; and storing they advertisement availability time with the key value at the trusted server. Determining the control value further may include determining, based on the budget consumption data, that a total budget cap for the advertisement has been met; and determining the key value to indicate the advertisement is not eligible in response to the total budget cap being met. Determining the error value may include inputting the target budget data and the budget consumption data into a PID controller. The set of key values may include duty cycle data describing eligibility for the set of advertisements; and generating the bid for the advertisement is further based on the duty cycle data. At 606, the process 600 includes generating a bid for the advertisements based on the set of key values. Generating the bid based on the duty cycle data may include providing the advertisement for generating the bid during a first portion of the duty cycle data and removing the advertisement from generating the bid during a second portion of the duty cycle data. Generating the bid for the set of advertisements may include determining eligibility data for the set of advertisements based at least in part on the set of key values.

At 608, the process 600 includes providing an advertisement for display at the browser based at least in part on the bid. The advertisement may be presented based on the advertisement winning the bid for the particular ad space.

Figure 7:
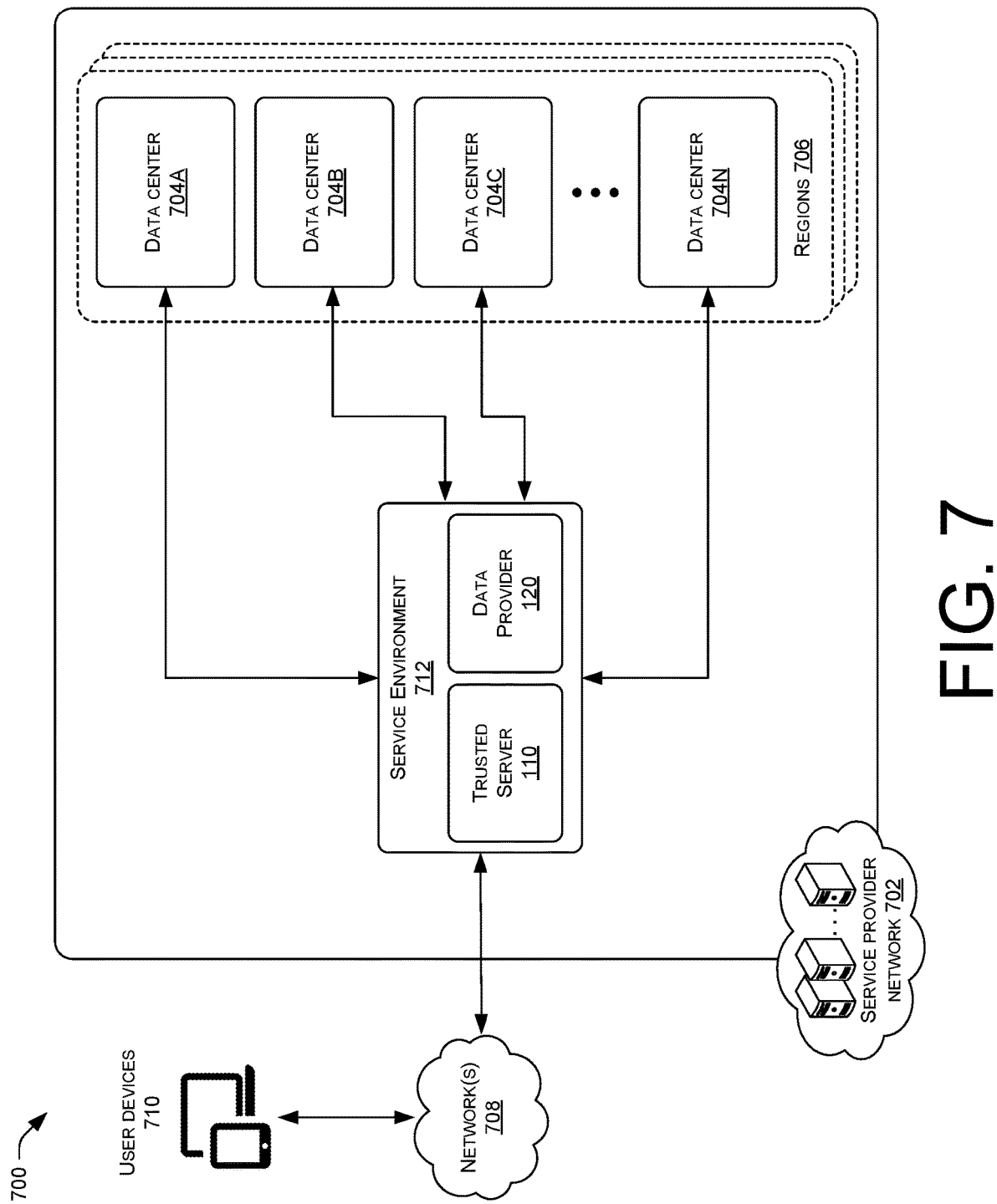
FIG. 7 illustrates a system and network diagram that includes an operating environment for a service provider network, wherein the service provider network can provide access to the trusted server and a data provider server for receiving, processing, and analyzing advertising data and budget consumption data for advertising content.

FIG. 7 is a system(s) and network diagram that shows an illustrative operating environment 700 that includes a service provider network 702, wherein the service provider network 702 can provide access to the trusted server 110 and a data provider 120 server for receiving, processing, and analyzing advertising data and budget consumption data for advertising content. The service provider network 702 may be configured to implement aspects of the functionality described herein, such as the functions of the trusted server 110, data provider 120, browser 104, or other such components described with respect to FIGS. 1-6. The service provider network 702 may provide computing resources, like virtual machine (VM) instances and storage, on a permanent or an as-needed basis. The computing resources provided by the service provider network 702 may include data processing resources, data storage resources, networking resources, data communication resources, network services, and the like. Among other types of functionality, the computing resources provided by the service provider network 702 may be utilized to implement the various services and components described above.

Each type of computing resource provided by the service provider network 702 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 702 may also be configured to provide other types of computing resources not mentioned specifically herein.

The computing resources provided by the service provider network 702 may be enabled in one embodiment by one or more data centers 704A-704N (which might be referred to herein singularly as "a data center 804" or in the plural as "the data centers 704"). The data centers 704 are facilities utilized to house and operate computer systems and associated components. The data centers 704 typically include redundant and backup power, communications, cooling, and security systems. The data centers 704 may also be located in geographically disparate locations, or regions 706. One illustrative embodiment for a data center 704 that may be utilized to implement the technologies disclosed herein will be described below with regard to FIG. 8.

The requests and responses that are transmitted between the trusted server 110, data provider 120, user device, and other systems can cause one or more operations to execute and machine learning algorithms to be deployed to the service provider network 702. In particular, the service environment 712 may transmit the requests for advertisement data, budget data, and other operations within the service environment 712. Additionally, advertisement materials may be provided to the various systems, from user devices 710 and/or other data submission portals, via the service provider network 702 over any wired and/or wireless network(s) 708, which may be a wide area communication network ("WAN"), such as the Internet, an intranet or an Internet service provider ("ISP") network or a combination of such networks 708. For example, and without limitation, user devices 710 can be operated by the users to transmit user requests to the service provider network 702, or computing resources thereof, by way of the network(s). It should be appreciated that a local-area network ("LAN"), the Internet, or any other networking topology known in the art that connects the data centers 704 to remote clients and other users may be utilized. It should also be appreciated that combinations of such networks may also be utilized. The service server 102 offered as a service by the service provider network 702 may manage the deployment of computing resources of the service provider network 702 when generating and managing certificate authorities.

In some examples, the service environment 712 can be implemented such that the trusted server 110, data provider 120, or other system components can be accessed via the service environment 712 and can access one or more additional service environments associated with the service provider network 702. In particular, the service provider network 702 can enable the trusted service 110 and/or data provider 120 to be hosted by the service environment 712 while maintaining the deployment of and access to services and APIs that are deployed to the one or more additional service environments and accessed via the data centers 704 and the regions 706.

Figure 8:
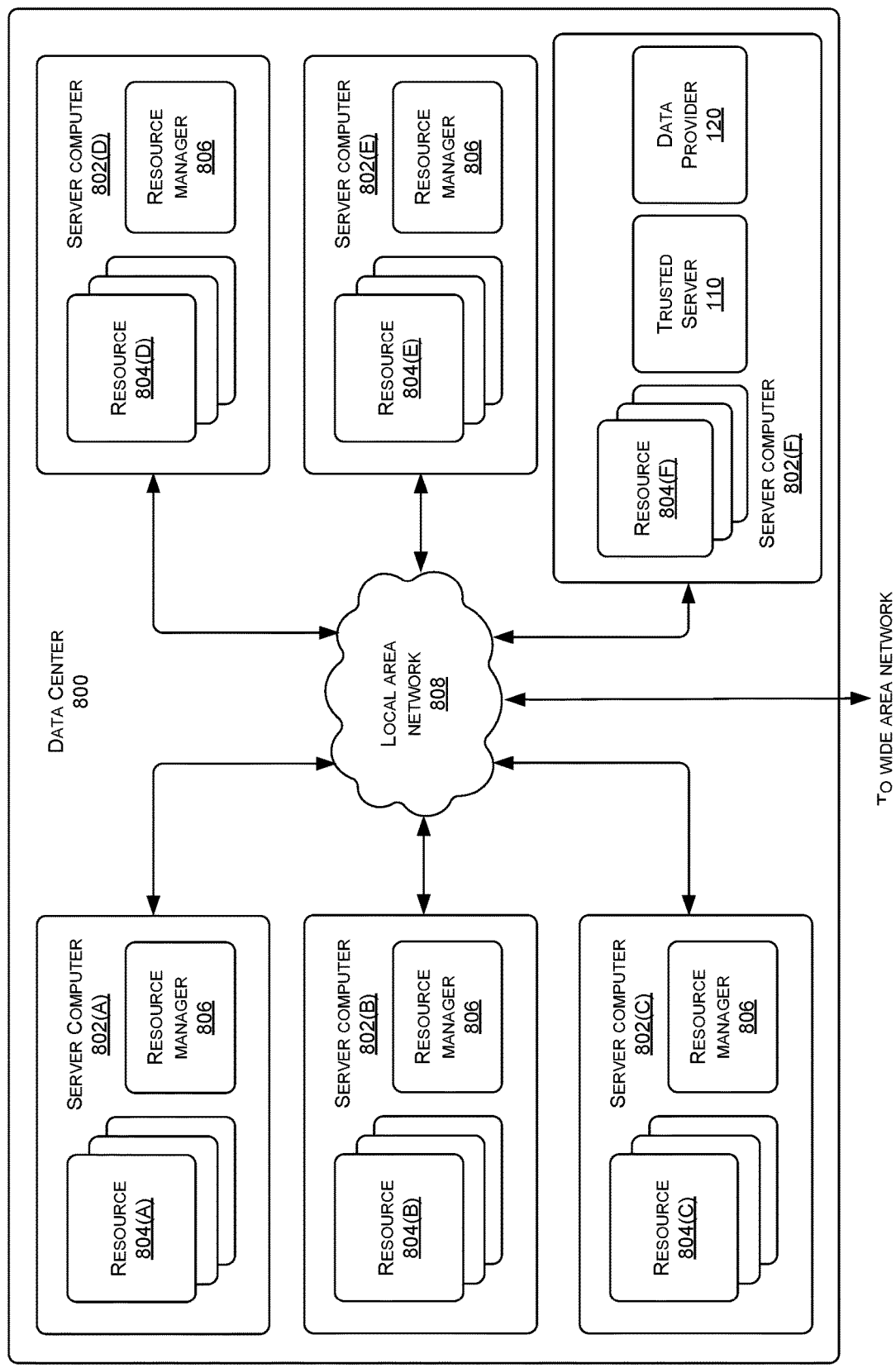
FIG. 8 illustrates a data center that implements aspects of the trusted server and the data provider for analyzing and providing key values for controlling budgets of advertising in on-device auctions.

FIG. 8 illustrates a data center 800 that implements aspects of the trusted server and the data provider for analyzing and providing key values for controlling budgets of advertising in on-device auctions. The example data center 800 shown in FIG. 8 can include several server computers 802A-802F (which might be referred to herein singularly as "a server computer 802" or in the plural as "the server computers 802") for providing computing resources 804A-804E.

The server computers 802 may be standard tower, rack-mount, or blade server computers configured appropriately for providing the computing resources described herein (illustrated in FIG. 8 as the computing resources 804A-804E). The computing resources provided by the service provider network may be data processing resources such as VM instances or hardware computing systems, database clusters, computing clusters, storage clusters, data storage resources, database resources, networking resources, and others. Some of the server computers 802 may also be configured to execute a resource manager 806 capable of instantiating and/or managing the computing resources. In the case of VM instances, for example, the resource manager 806 may be a hypervisor or another type of program configured to enable the execution of multiple VM instances on a single server computer 802. Server computers 802 in the data center 800 may also be configured to provide network services and other types of services.

In the example data center 800 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of a plurality of data centers, between each of the server computers 802A-802F in each data center 800, and, potentially, between computing resources in each of the server computers 802. It should be appreciated that the configuration of the data center 800 described with reference to FIG. 8 is merely illustrative and that other implementations may be utilized.

The data center 800 shown in FIG. 8 also includes a server computer 802F that may execute some or all of the software components described above by FIGS. 1-6. For example, and without limitation, the server computer 802F (and the other server computers 802) may generally correspond to a server/computing device configured to execute components including, without limitation, the service server 102 that processes advertisement data and product data for consumers, as described herein, and/or the other software components described above. The server computer 802F may also be configured to execute other components and/or to store data for providing some or all of the functionality described herein. In this regard, it should be appreciated that the components illustrated in FIG. 8 as executing on the server computer 802F may execute on many other physical or virtual servers in the data centers 800 in various embodiments. Thus, the data center 800 in FIG. 8 may also include a plurality of server computers 802 that execute a fleet of VM instances.

Figure 9:
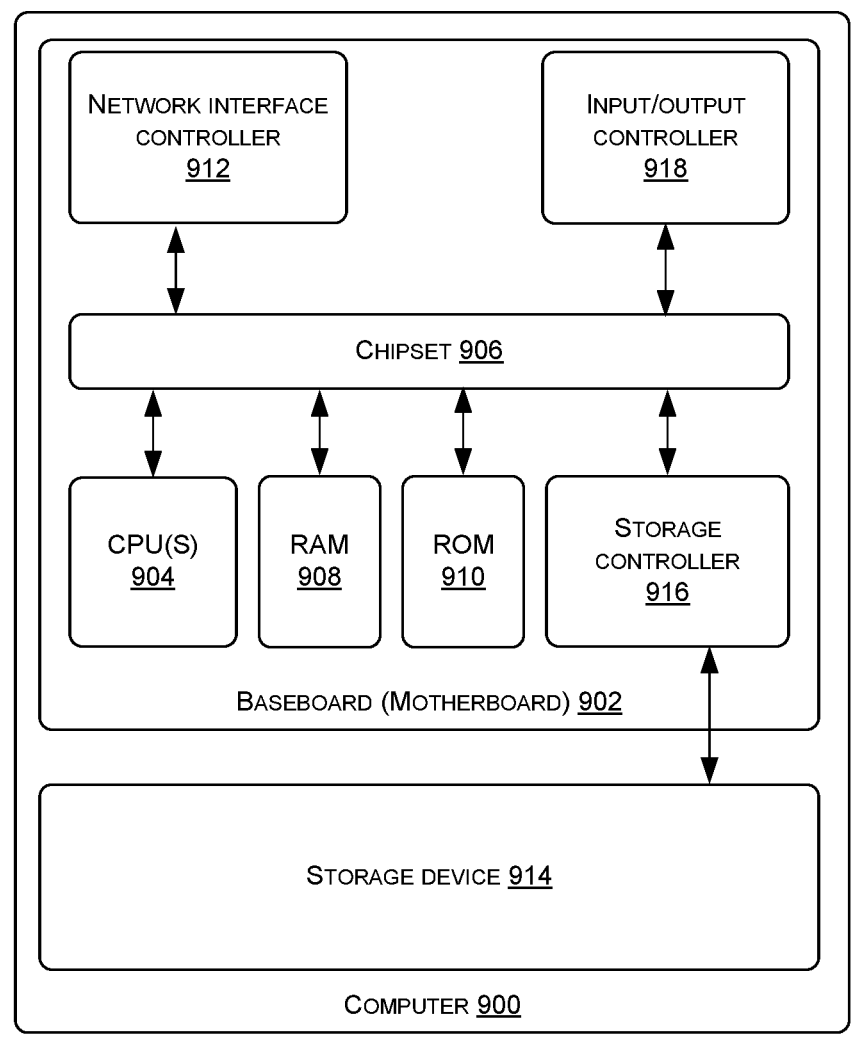
FIG. 9 illustrates an example computer architecture for a computer or a server capable of executing program components for implementing control of advertising budgets for on-device auctions of advertising materials.

FIG. 9 shows an example computer architecture for a computer 900 capable of executing program components for implementing the enhancement systems and enrichment systems described above. The computer architecture shown in FIG. 9 illustrates a server computer, workstation, desktop computer, laptop, tablet, network appliance, e-reader, smartphone, or other computing device, and may be utilized to execute any of the software components presented herein. In some examples, the computer 900 may correspond to one or more computing devices that implements the components and/or services described herein (e.g., the user devices 102, the trusted server 110, the data provider 120, etc.). In some additional examples, the computer 900 may correspond the enrichment system and/or the enhancement system. In some further examples, the computer 900 can be configured to interact with or correspond to any of the systems and/or implement the methods discussed in FIGS. 1-8.

The computer 900 includes a baseboard 902, or "motherboard," which is a printed circuit board to which a multitude of components or devices may be connected by way of system(s) bus or other electrical communication paths. In one illustrative configuration, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

In some alternative examples, the CPUs 904 can be replaced and/or be configured to interact with one or more processors. It should be noted that the one or more processors can include the CPUs 904, one or more graphics processing units (GPUs), both the CPUs 904 and GPUs, and/or other processing units or components known in the art. For example, the one or more processors can include one or more processing units configured as controllers, microcontrollers, computational devices, microprocessors, and/or other computational devices configured to control and/or cause a user device to execute the operations described above.

The chipset 906 provides an interface between the CPUs 904 and the remainder of the components and devices on the baseboard 902. The chipset 906 may provide an interface to a random-access memory (RAM) 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the LAN 808. The chipset 906 may include functionality for providing network connectivity through a network interface controller (NIC) 912, such as a gigabit Ethernet adapter. The NIC 912 is capable of connecting the computer 900 to other computing devices over the LAN 808. It should be appreciated that multiple NICs 912 may be present in the computer 900, connecting the computer to other types of networks and remote computer systems. In some examples, the network interface controller can be associated with one or more transceivers that can include one or more wired or wireless transceivers. For example, the transceivers can include a network adapter, a LAN adapter, an address associated with a network connection, or another device permitting communications to be sent and received. Additionally, the one or more transceivers can comprise any wireless transceiver capable of engaging in wireless, radio frequency (RF) communication. Further, the one or more transceivers can also include other wireless modems, such as Wi-Fi, WiMAX, Bluetooth, and/or infrared communication modems.

The computer 900 may be connected to a mass storage device 914 that provides non-volatile storage for the computer 900. The mass storage device 914 may store an operating system, programs, and/or components including, without limitation, the service server 102 that processes data using data pipelines, as described herein, and data, which have been described in greater detail herein. The mass storage device 914 may be connected to the computer 900 through a storage controller 916 connected to the chipset 906. The mass storage device 914 may consist of one or more physical storage units. The storage controller 916 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 914 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 914 is characterized as primary or secondary storage, and the like.

For example, the computer 900 may store information to the mass storage device 914 by issuing instructions through the storage controller 916 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 914 by detecting the physical states or characteristics of one or more particular locations within the physical storage units.

In addition to the mass storage device 914 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900. In some examples, the operations performed by the service provider network 702, and or any components and/or services included therein, may be carried out by the processor(s).

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 914 may store an operating system utilized to control the operation of the computer 900. According to one embodiment, the operating system comprises the LINUX operating system. According to another embodiment, the operating system comprises the WINDOWS® SERVER operating system from MICROSOFT® Corporation of Redmond, Washington. According to further embodiments, the operating system may comprise the UNIX operating system or one of its variants. It should be appreciated that other operating systems may also be utilized. The mass storage device 914 may store other system or application programs and data utilized by the computer 900.

In one embodiment, the mass storage device 914 or other computer-readable storage media is encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various processes described above with regard to FIGS. 1-5. The computer 900 may also include computer-readable storage media having instructions stored thereupon for performing any of the other computer-implemented operations described herein.

The computer 900 may also include one or more input/output controllers 918 for receiving and processing input from a number of input devices, such as a keyboard, a mouse, a touchpad, a touch screen, an electronic stylus, or other type of input device. Similarly, an input/output controller 918 may provide output to a display, such as a computer monitor, a flat-panel display, a digital projector, a printer, or other type of output device. It will be appreciated that the computer 900 might not include all of the components shown in FIG. 9, may include other components that are not explicitly shown in FIG. 9, or might utilize an architecture completely different than that shown in FIG. 9.

While various examples and embodiments are described individually herein, the examples and embodiments may be combined, rearranged, and modified to arrive at other variations within the scope of this disclosure. Additionally, and although the subject matter presented herein has been described in language specific to computer structural features, methodological acts and computer readable media, it is to be understood that the subject matter defined in the appended claims is not necessarily limited to the specific features, acts, or media described herein. Rather, the specific features, acts and media are disclosed as example forms of implementing the claims. Moreover, the subject matter described above is provided by way of illustration only and should not be construed as limiting.

What is claimed is:

1. A system comprising:
   one or more processors; and
   one or more memory devices storing one or more computer-executable instructions that are executable by the one or more processors to perform operations comprising:
   determining a control value for delivery of first targeted content to a browser from a first set of targeted content by;
      determining budget data for delivering the first targeted content comprising a time window and a first amount to target spending during the time window;
      determining budget consumption data for the time window describing a second amount spent during the time window; and
      determining the control value based on an error value between the budget data and the budget consumption data;
   determining, in real-time, a key value for the first targeted content based on converting the control value to a pulse-width modulation control signal, the key value describing availability of the first targeted content for bidding and pricing information for the first targeted content, the pulse-width modulation control signal indicating budget allocation associated with the first targeted content;
   storing, in a trusted server for a computing environment including the first targeted content the key value associated with the first targeted content, wherein the key value prevents a third-party cookie from being stored at the trusted server;
   determining an interest group associated with a browser instance, the interest group defined based on previous activity at the browser instance and describing a privacy-preserving set of interests for the browser instance for delivering targeted content to a user;
   conveying a request to the trusted server for key values associated with a second set of targeted content associated with the interest group;
   receiving, from the trusted server, the key values, the key values indicating one or more targeted content items that are eligible or not eligible to bid;
   generating a bid by:
      generating a third set of targeted content by filtering the second set of targeted content to remove a portion of the one or more targeted content items that are not eligible to bid based on the key values, the third set of targeted content enabling the browser instance to select an eligible targeted content item in real-time; and
      ranking the third set of targeted content based on the key values; and
   providing second targeted content of the third set of targeted content for real-time display at the browser instance based at least in part on the bid.

2. The system as recited in claim 1, wherein converting the control value to the pulse-width modulation control signal includes:
   defining a cycle time;
   determining a scalar having a value between zero and one, the scalar based on the control value;
   multiplying the cycle time by the scalar to determine an availability time, wherein the first targeted content is eligible to generate the bid during the availability time; and
   storing they availability time with the key value at the trusted server.

3. The system as recited in claim 1, wherein determining the control value further comprises:
   determining, based on the budget consumption data, that a total budget cap for the first targeted content has been met; and determining the control value to indicate the first targeted content is not eligible in response to the total budget cap being met.

4. The system as recited in claim 1, wherein determining the control value based on the error value comprises inputting the budget data and the budget consumption data into a PID controller.

5. A method comprising:
receiving, at a computing device of a data provider, consumption data describing budget consumption for a set of content;
receiving, at the computing device, target budget data associated with the set of content;
determining, by the computing device, an error based on the consumption data and the target budget data;
determining, by the computing device, a control value based on the error between the target budget data and the budget consumption data;
determining, by the computing device, a set of key values for the set of content, the set of key values describing availability and pricing information for the set of content based on the error and converting the control value to a control signal, the control signal adjusting a rate of delivery of the set of content; and
storing, by the computing device, the set of key values for the set of content in a trusted server, the set of key values configured for use in on-device content auctions.

6. The method of claim 5, wherein determining the set of key values comprises:
determining the target budget data for the set of content comprising a time window and a first amount to target spending during the time window;
determining the budget consumption data for the time window describing a second amount spent during the time window;
and
determining a key value of the set of key values further based on the control value.

7. The method of claim 6, wherein the control signal comprises a pulse-width modulation control signal and converting the control value includes:
defining a cycle time;
determining a scalar having a value between zero and one, the scalar based on the control value;
multiplying the cycle time by the scalar to determine an availability time, wherein a content item of the set of content is eligible to bid during the availability time; and
storing they availability time with the key value at the trusted server.

8. The method of claim 6, wherein determining the control value further comprises:
determining, based on the budget consumption data, that a total budget cap for a content item of the set of content has been met; and
determining the key value to indicate the content item is not eligible in response to the total budget cap being met.

9. The method of claim 6, wherein determining the error value comprises inputting the target budget data and the budget consumption data into a PID controller.

10. The method of claim 5, wherein:
the set of key values comprise duty cycle data describing eligibility for the set of content; and
the set of key values being configured for use in on-device content auctions comprises a content item associated with a key value of the set of key values being available for bidding based on the duty cycle data.

11. The method of claim 10, wherein the content associated with the key value being available for bidding comprises providing the content item for generating the bid during a first portion of the duty cycle data and removing the content from generating the bid during a second portion of the duty cycle data.

12. The method of claim 5, wherein the set of key values being configured for use in on-device content auctions comprises determining eligibility data for the set of content based at least in part on the set of key values.

13. One or more non-transitory computer-readable media storing one or more instructions that are executable by one or more processors to perform operations comprising:
receiving, at a computing device of a data provider, consumption data describing budget consumption for a set of content;
receiving, at the computing device, target budget data associated with the set of content;
determining, by the computing device, an error based on the consumption data and the target budget data;
determining, by the computing device, a control value based on the error between the target budget data and the budget consumption data;
determining, by the computing device, a set of key values for the set of content, the set of key values describing availability and pricing information for the set of content based on the error and converting the control value to a control signal, the control signal adjusting a rate of delivery of the set of content; and
storing, by the computing device, the set of key values for the set of content in a trusted server, the set of key values configured for use in on-device content auctions.

14. The one or more non-transitory computer-readable media of claim 13, wherein determining the set of key values comprises:
determining the target budget data for the set of content comprising a time window and a first amount to target spending during the time window;
determining the budget consumption data for the time window describing a second amount spent during the time window;
and
determining a key value of the set of key values further based on the control value.

15. The one or more non-transitory computer-readable media of claim 14, wherein the control signal comprises pulse-width modulation control signal, and converting the control value includes:
defining a cycle time;
determining a scalar having a value between zero and one, the scalar based on the control value;
multiplying the cycle time by the scalar to determine an availability time, wherein a content item of the set of content is eligible to bid during the availability time; and
storing the availability time with the key value at the trusted server.

16. The one or more non-transitory computer-readable media of claim 14, wherein determining the control value further comprises:
determining, based on the budget consumption data, that a total budget cap for a content item of the set of content has been met; and determining the key value to indicate the content item is not eligible in response to the total budget cap being met.

17. The one or more non-transitory computer-readable media of claim 14, wherein determining the error value comprises inputting the target budget data and the budget consumption data into a PID controller.

18. The one or more non-transitory computer-readable media of claim 13, wherein:
   the set of key values comprise duty cycle data for generating a bid for a content item; and
   the set of key values being configured for use in on-device content auctions comprises content associated with a key value of the set of key values being available for bidding based on the duty cycle data.

19. The one or more non-transitory computer-readable media of claim 18, wherein the content associated with the key value being available for bidding comprises providing a content item for generating the bid during a first portion of the duty cycle data and removing the content from generating the bid during a second portion of the duty cycle data.

20. The one or more non-transitory computer-readable media of claim 13, wherein the set of key values being configured for use in on-device content auctions comprises determining eligibility data for the set of content based at least in part on the set of key values.

* * * * *